(12) United States Patent
Bao

(10) Patent No.: US 8,233,215 B2
(45) Date of Patent: Jul. 31, 2012

(54) OPTICAL MODULE MANUFACTURING AND TESTING SYSTEMS AND METHODS

(75) Inventor: Jun Bao, Ellicott City, MD (US)

(73) Assignee: Ciena Corporation, Linthicum, MD (US)

( * ) Notice: Subject to any disclaimer, the term of this patent is extended or adjusted under 35 U.S.C. 154(b) by 542 days.

(21) Appl. No.: 12/542,899

(22) Filed: Aug. 18, 2009

(65) Prior Publication Data

US 2011/0043896 A1    Feb. 24, 2011

(51) Int. Cl.
*H04B 10/08* (2006.01)
*H04B 10/17* (2006.01)
*G02B 6/46* (2006.01)

(52) U.S. Cl. ........................................................ 359/337
(58) Field of Classification Search ................... 359/337
See application file for complete search history.

(56) References Cited

U.S. PATENT DOCUMENTS

| | | | | |
|---|---|---|---|---|
| 4,512,036 A * | 4/1985 | Laor | | 398/156 |
| 5,099,348 A * | 3/1992 | Huddleston et al. | | 398/107 |
| 6,111,687 A * | 8/2000 | Tammela | | 359/337.2 |
| 6,424,457 B1 | 7/2002 | Koonmen et al. | | |
| 6,426,833 B1 | 7/2002 | Bao | | |
| 6,501,595 B1 | 12/2002 | Drake et al. | | |
| 6,538,778 B1 * | 3/2003 | Leckel et al. | | 398/25 |
| 6,590,644 B1 | 7/2003 | Coin et al. | | |
| 6,721,089 B1 | 4/2004 | Miller et al. | | |
| 6,900,931 B1 | 5/2005 | Sridhar et al. | | |
| 7,035,505 B2 * | 4/2006 | Shen et al. | | 385/24 |
| 7,139,118 B2 | 11/2006 | Griggs et al. | | |
| 7,362,498 B1 * | 4/2008 | Li et al. | | 359/341.41 |
| 7,400,443 B1 | 7/2008 | Sridhar et al. | | |
| 7,512,295 B2 * | 3/2009 | Welch et al. | | 385/14 |
| 8,068,739 B2 * | 11/2011 | Levinson | | 398/135 |
| 2001/0040720 A1 * | 11/2001 | Gerrish et al. | | 359/341.4 |
| 2002/0093729 A1 * | 7/2002 | Gerish et al. | | 359/341.41 |
| 2002/0131159 A1 * | 9/2002 | Ye et al. | | 359/337.2 |
| 2002/0149821 A1 * | 10/2002 | Aronson et al. | | 359/152 |
| 2003/0016419 A1 * | 1/2003 | Palmer et al. | | 359/154 |
| 2003/0053165 A1 * | 3/2003 | Nagayama et al. | | 359/110 |
| 2003/0053170 A1 * | 3/2003 | Levinson et al. | | 359/152 |

(Continued)

OTHER PUBLICATIONS

Agilent Technologies; EDFA Testing With the Interpolation Technique—Product Note 71452-1; Agilent 71452B Optical Spectrum Analyzer.

*Primary Examiner* — Mark Hellner
*Assistant Examiner* — Ari M Diacou
(74) *Attorney, Agent, or Firm* — Clements Bernard PLLC; Christopher L. Bernard; Lawrence A. Baratta, Jr.

(57) ABSTRACT

The present disclosure relates to streamlining optical module and/or subassembly development, manufacturing, and testing through introducing a memory component within a module and/or subassembly that is utilized with a host module for system calibration and/or configuration. In an exemplary embodiment, the present invention can streamline optical amplifier (EDFA) module and/or subassembly development, manufacturing, and testing. The present invention includes an optical module/sub-assembly without control circuitry, i.e. a "dumb module", but with a memory that is used to load relevant data from a supplier. This data is utilized to calibrate, test, and configure the optical module/sub-assembly in a host module. The host module includes control circuitry to access this memory in the optical module/sub-assembly and to calibrate, test, configure, and control the optical module/sub-assembly. Advantageously, this additional memory reduces manufacturing time without the disadvantage of adding complexity in the optical module/sub-assembly.

20 Claims, 5 Drawing Sheets

U.S. PATENT DOCUMENTS

| | | | |
|---|---|---|---|
| 2004/0012844 A1* | 1/2004 | Ohtsuki et al. | 359/341.1 |
| 2004/0019459 A1 | 1/2004 | Dietz et al. | |
| 2004/0161248 A1* | 8/2004 | Stewart et al. | 398/196 |
| 2004/0208526 A1* | 10/2004 | Mibu | 398/33 |
| 2005/0047778 A1* | 3/2005 | Levinson | 398/9 |
| 2005/0089334 A1* | 4/2005 | Regev et al. | 398/139 |
| 2005/0129415 A1* | 6/2005 | Tang | 398/208 |
| 2005/0191053 A1* | 9/2005 | Levinson et al. | 398/25 |
| 2006/0093363 A1* | 5/2006 | Dybsetter et al. | 398/135 |
| 2006/0263092 A1* | 11/2006 | Hosking et al. | 398/135 |
| 2007/0116478 A1* | 5/2007 | Chen | 398/195 |
| 2007/0230954 A1* | 10/2007 | Sakai et al. | 398/12 |
| 2008/0031620 A1* | 2/2008 | Hudgins et al. | 398/9 |
| 2008/0267621 A1* | 10/2008 | Sheth et al. | 398/25 |
| 2010/0329666 A1* | 12/2010 | Zheng et al. | 398/1 |
| 2012/0033979 A1* | 2/2012 | Priyadarshi | 398/141 |
| 2012/0057863 A1* | 3/2012 | Winzer et al. | 398/3 |

\* cited by examiner

OPTICAL MODULE MANUFACTURING AND TESTING SYSTEMS AND METHODS

FIELD OF THE INVENTION

The present invention relates generally to optical amplifier modules. More particularly, the present relates to streamlining optical module and/or subassembly development, manufacturing, and testing through introducing a memory component within a module and/or subassembly that is utilized with a host module for system calibration and/or configuration.

BACKGROUND OF THE INVENTION

Erbium Doped Fiber Optical Amplifier (EDFA) modules and/or subassemblies used in optical communication networks generally include multiple elements such as erbium doped fiber, isolators, monitor taps, photo detectors, pumps, wavelength division multiplexers or combiners, splitters, etc. In order to properly control module and/or subassembly based on difference system configurations, the module and/or subassembly must have calibration data, configuration data, and the like. There are two conventional methods to achieve properly EDFA module and/or subassembly control—a "smart" EDFA module and/or subassembly with a built-in control circuit and a "dumb" EDFA module and/or subassembly without a control circuit. The smart EDFA module and/or subassembly with the built-in control circuit has all calibration data stored within the module and/or subassembly. A communication interface such as an RS232 serial data link or an Inter-Integrated Circuit (I2C) provides communication between a host module (system) and the module and/or subassembly. The host module, based on a system configuration, sets a desired control power level command. The smart EDFA module and/or subassembly, based on the command, accesses the data retaining device to retrieve the corresponding data to finish power level control. The dumb EDFA module and/or subassembly without the control circuit requires the host module for accessing data. In this method, the host module (system) stores all calibration data and a circuit on a host board accesses the data retaining device to retrieve the corresponding data to finish power level control.

In actual implementations, the smart EDFA module and/or subassembly, for different suppliers, the implementations significantly differed between suppliers thereby leading to difficulty in EDFA controlling behaviors. This makes system validation more complicated and in some cases software and hardware defects can take several years to show up and become fully understood. For systems-based integrators and manufacturers, the dumb EDFA implementation is more suitable since integrators and manufacturers define the system and integrators and manufacturers more clearly understand the system requirement. The dumb EDFA implementation can minimize hardware and software defects. A mistake can be easily and quickly found. The hardware and software design can be inherited for future EDFA modules and/or subassemblies.

However, dumb EDFA implementation is very labor intensive especially for advanced optical system where multi-pumps, multi-photo-detectors, and multi-variable-optical-attenuators are used. This can lead to several hours required to fully calibrate the EDFA. A dumb gain block purchased from supplier typically already has been tested and some calibration data is available in a database but not with a dumb EDFA module and/or subassembly.

BRIEF SUMMARY OF THE INVENTION

In various exemplary embodiments, the present invention relates to streamlining optical module and/or subassembly development, manufacturing, and testing through introducing a memory component within a module and/or subassembly that is utilized with a host module for system calibration and/or configuration. In an exemplary embodiment, the present invention can streamline optical amplifier (EDFA) module and/or subassembly development, manufacturing, and testing. The present invention includes an optical module/sub-assembly without control circuitry, i.e. a "dumb module", but with a memory that is used to load relevant data from a supplier. This data is utilized to calibrate, test, and configure the optical module/sub-assembly in a host module. The host module includes control circuitry to access this memory in the optical module/sub-assembly and to calibrate, test, configure, and control the optical module/sub-assembly. Advantageously, this additional memory reduces manufacturing time without the disadvantage of adding complexity in the optical module/sub-assembly.

In an exemplary embodiment of the present invention, a module includes one or more optical components including a plurality of configurable parameters; memory including data loaded by a module supplier relevant to the one or more optical components; wherein the module is integrated within a host module, and wherein the module include no control circuit thereby utilizing control circuitry on the host module. The one or more optical components can include an optical amplifier gain block. The one or more optical components can include any of erbium doped fiber, optical isolators, monitor taps, photo detectors, pump lasers, variable optical attenuators, couplers, and splitters. The module further includes a communication interface to the host module. The memory is loaded by the module supplier with data for the one or more optical components, and wherein the data comprises any of configuration settings, calibration data, manufacturing testing data, and supportable ranges. The data can include photodiode response, pump operation current, and variable optical attenuator setting points at different power levels and configurations. The data can also include pump kink free current, pump threshold, and thermoelectric cooler maximum current. Optionally, the memory includes any of random-access memory (RAM), read-only memory (ROM), a programmable read-only-memory (PROM), an electronically programmable read-only-memory (EPROM), an electronically erasable and programmable read-only-memory (EEPROM), FLASH memory, registers, and combinatory logic. Alternatively, the memory includes an electronically erasable and programmable read-only-memory (EEPROM) with an integrated Inter-Integrated Circuit (I2C) for communication. The module can include one of an optical transceiver, an optical power monitor (OPM), a de-multiplexer/multiplexer, a variable optical attenuator (VOA) array, and a reconfigurable optical add/drop module (ROADM).

In another exemplary embodiment of the present invention, a method of integrating an optical sub-assembly with a host module includes obtaining an optical sub-assembly from a sub-assembly supplier, wherein the optical sub-assembly comprises memory and does not comprise a control circuit; assembling the optical sub-assembly with a host module adapted to receive the optical sub-assembly; accessing the memory on the optical sub-assembly with the host module to access data related to optical components in the optical sub-assembly; and calibrating, testing, and configuring the optical sub-assembly with the host module utilizing the data. The optical sub-assembly can include an optical amplifier gain block. The optical sub-assembly can also include components comprising any of erbium doped fiber, optical isolators, monitor taps, photo detectors, pump lasers, variable optical attenuators, couplers, and splitters. The memory is loaded by the sub-assembly supplier with data for one or more optical components, and wherein the data comprises any of configuration settings, calibration data, manufacturing testing data, and supportable ranges. The data can include photodiode response, pump operation current, and variable optical attenuator setting points at different power levels and configurations. The data can also include pump kink free current, pump threshold, and thermoelectric cooler maximum current. Optionally, the memory includes any of random-access memory (RAM), read-only memory (ROM), a programmable read-only-memory (PROM), an electronically programmable read-only-memory (EPROM), an electronically erasable and programmable read-only-memory (EEPROM), FLASH memory, registers, and combinatory logic. Alternatively, the memory includes an electronically erasable and programmable read-only-memory (EEPROM) with an integrated Inter-Integrated Circuit (I2C) for communication.

In yet another exemplary embodiment of the present invention, an optical amplifier includes a plurality of optical components each including a plurality of configurable parameters, wherein the plurality of optical components comprise a length of erbium doped fiber, one or more optical isolators, one or more monitor taps, one or more photo detectors, one or more pump lasers, one or more variable optical attenuators, one or more couplers, and one or more splitters; memory including data loaded by a module supplier relevant to the plurality of optical components; wherein the optical amplifier is integrated within a host module, and wherein the optical amplifier comprises no control circuit thereby utilizing control circuitry on the host module. The memory is loaded by the module supplier with data for the one or more optical components, and wherein the data includes any of configuration settings, calibration data, manufacturing testing data, and supportable ranges. The data includes any of photodiode response, pump operation current, variable optical attenuator setting points at different power levels and configurations, pump kink free current, pump threshold, and thermoelectric cooler maximum current.

BRIEF DESCRIPTION OF THE DRAWINGS

The present invention is illustrated and described herein with reference to the various drawings, in which like reference numbers denote like method steps and/or system components, respectively, and in which.

DETAILED DESCRIPTION OF THE INVENTION

In various exemplary embodiments, the present invention relates to streamlining optical module and/or subassembly development, manufacturing, and testing through introducing a memory component within a module and/or subassembly that is utilized with a host module for system calibration and/or configuration. In an exemplary embodiment, the present invention can streamline optical amplifier (EDFA) module and/or subassembly development, manufacturing, and testing. The present invention includes an optical module/sub-assembly without control circuitry, i.e. a "dumb module", but with a memory that is used to load relevant data from a supplier. This data is utilized to calibrate, test, and configure the optical module/sub-assembly in a host module. The host module includes control circuitry to access this memory in the optical module/sub-assembly and to calibrate, test, configure, and control the optical module/sub-assembly. Advantageously, this additional memory reduces manufacturing time without the disadvantage of adding complexity in the optical module/sub-assembly.

Figure 1:
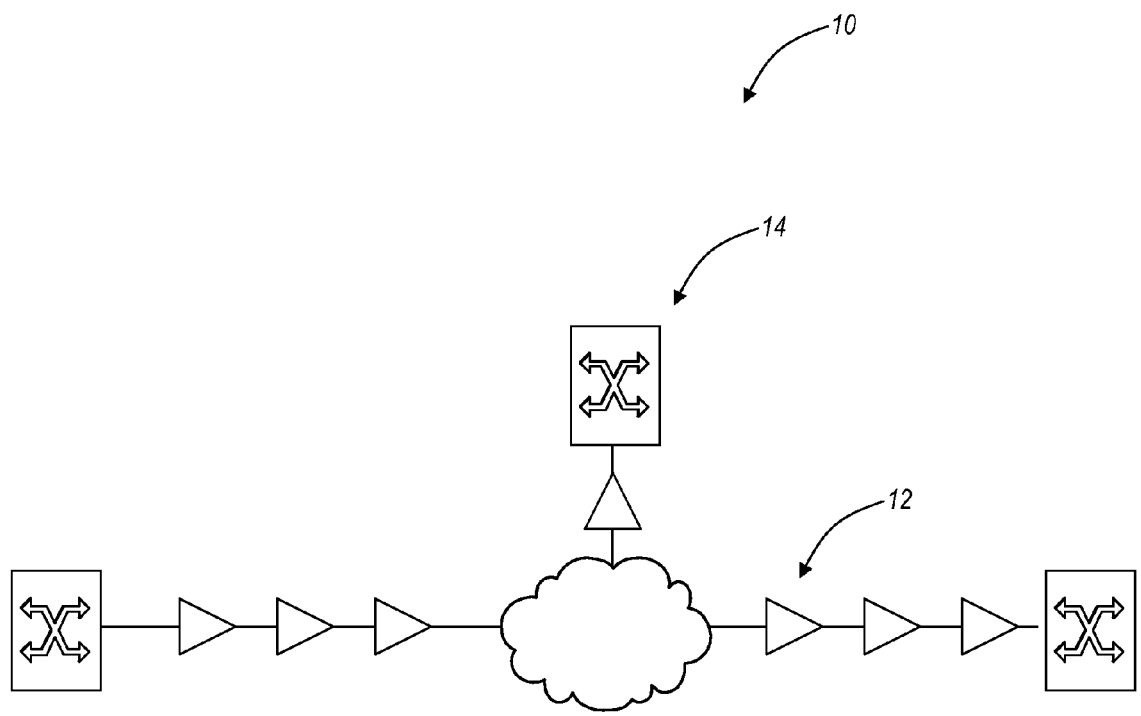
FIG. 1 is an optical network with a plurality of optical amplifier (EDFA) modules according to an exemplary embodiment of the present invention.

Referring to FIG. 1, an optical network 10 is illustrated with a plurality of optical amplifier (EDFA) modules 12 according to an exemplary embodiment of the present invention. The optical network 10 can include a plurality of terminals 14 that provide optical-electrical-optical (OEO) access to one or more wavelengths. The terminals 14 can provide optical add/drop multiplexing (OADM) capabilities whereby only some wavelengths are added/dropped with the remaining wavelengths passing through. The modules 14 can be located at the terminals 14 (in a pre/post amplifier configuration) as well as intermediate optical amplifier nodes to provide mid-span amplification. An EDFA module, such as the module 12, can provide amplification of wavelengths between approximately 1530 nm and 1560 nm (referred to as the "C" band). Additionally, the optical network 10 include a plurality of wavelengths, such as 40, 80, etc. wavelengths based on standardized frequency spacing, i.e. the ITU grid. For example, each wavelength can include a signal at 10 Gbps, 40 Gbps, 100 Gbps, etc. Also, each wavelength can include polarization multiplexing as well.

Figure 2:
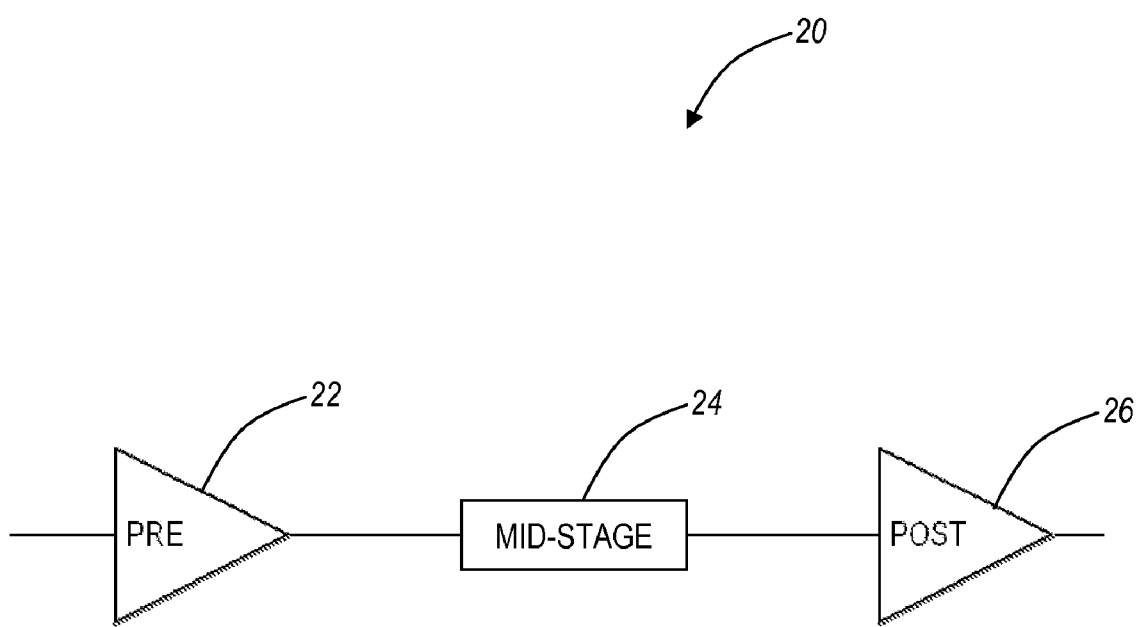
FIG. 2 is a further detailed view of the optical amplifier (EDFA) module of FIG. 1 showing an amplifier configuration for a single amplifier site.

Referring to FIG. 2, a more detailed view of the optical amplifier (EDFA) module 12 is illustrated showing an amplifier configuration 20 for a single amplifier site. The amplifier configuration 20 includes a pre-amplifier stage 22, a mid-stage 24, and a post-amplifier stage 26, collectively providing a single EDFA module 12, for example. The pre-amplifier stage 22 provides initial amplification of an input signal, and can include low-noise components. The mid-stage 24 provides access to the signal for a variety of functions, such as optical add/drop, dispersion compensation and dispersion slope management such as using a dispersion compensation module (DCM), dynamic gain equalization such as using a dynamic gain flattening filter, and the like. The post-amplifier stage 26 provides power amplification of the mid-stage signal and outputs the amplified signal. In an exemplary embodiment, the amplifier configuration 20 is contained or housed in a single module, such as a smart or dumb EDFA module and/or subassembly.

Figure 3:
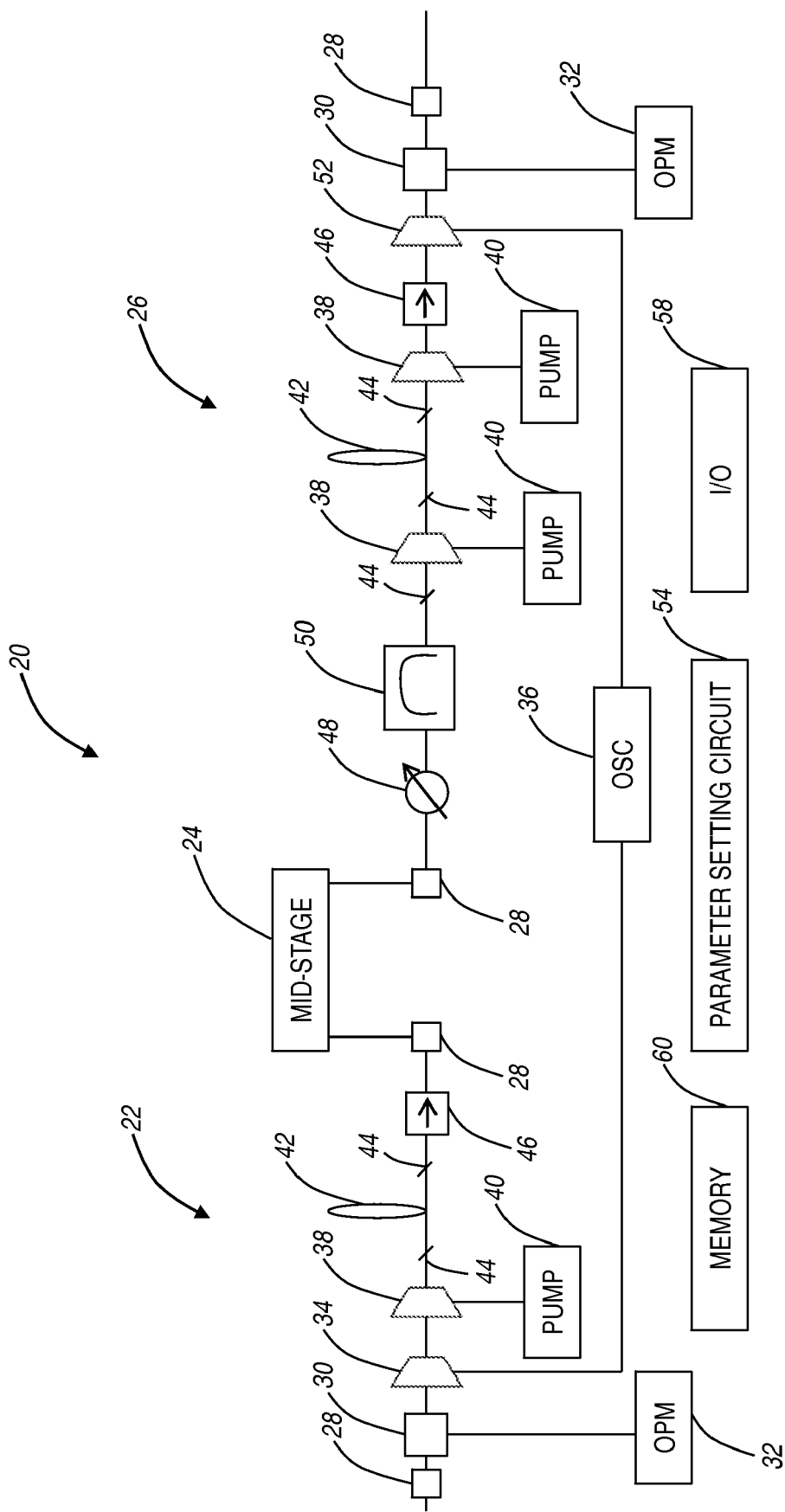
FIG. 3 is a diagram of various exemplary components in the amplifier configuration of FIG. 2 according to an exemplary embodiment of the present invention.

Referring to FIG. 3, various components in the amplifier configuration 20 are illustrated according to an exemplary embodiment of the present invention. The various components illustrated herein with respect to the amplifier configuration 20 are shown for exemplary illustration purposes, and those of ordinary skill will recognize the amplifier configuration 20 can include additional components, a different architecture, and the like. The present invention relates to streamlining optical amplifier (EDFA) module and/or subassembly development, manufacturing, and testing, and can therefore apply to any amplifier configuration 20. As described above, the amplifier configuration 20 can be contained or housed in a single module, such as a smart or dumb EDFA module and/or subassembly. For example, the single module can include a plurality of connectors 28 to provide fiber connections to the input, the mid-stage 24, and the output.

The input signal is provided to one of the connectors 28. A tap 30 can be utilized to provide divert a small portion of optical power (e.g., 5%, etc.) for purposes of optical monitoring through an optical power monitor (OPM) 32. Next, a de-multiplexer 34 can split the input signal from an optical service channel (OSC). For example, the input signal can include a plurality of wavelengths in the C-band plus an out-of-band OSC at 1510 nm or 1625 nm. The OSC is dropped, processed, and re-added through an OSC 36 component that generally includes a receiver, processing circuitry, and a transmitter. Next, a multiplexer 38 combines a signal from a pump laser 40 to a fiber spool 42 (the fiber spool 42 is shown spliced into the amplifier configuration 20 through fiber splices 44). Note, the amplifier configuration 20 can include a plurality of fiber splices 44 which are made using any splicing mechanism known in the art, e.g. fusion splicing, etc. FIG. 3 illustrates a couple of the fiber splices 44 for illustration purposes.

The fiber spool 42 includes a length of fiber that is doped with a suitable dopant, such as erbium. The pump laser 40 is configured to provide optical power at a specific wavelength, such as 980 nm, 1480 nm, etc., to provide amplification of the input signal through the fiber spool 42. An isolator 46 is disposed after the fiber spool 42. The isolator 46 is configured to prevent power from the pump laser 40 and other noise from re-entering the fiber spool 42. Next, there are two connectors 28 which lead to the mid-stage 24. In this exemplary embodiment, the mid-stage 24 is illustrated as a separate component to the amplifier configuration 20 whereby other devices can be physically added through the connectors 28, e.g. DCMs, gain filters, OADMs, etc. Alternatively, these same components can be disposed within the amplifier configuration 20 as well. The amplifier configuration 20 can also include a variable optical attenuator (VOA) 48 and a gain flattening filter 50.

After the mid-stage 24, the post-amp stage 26 includes pump lasers 40 coupled to another fiber spool 42 with couplers 38. Note, in the post-amp stage 26, the fiber spool 42 includes two pump lasers 40 on either side to provide increased power. This configuration can vary as those of ordinary skill in the art will recognize. Also, there is another isolator 46 in the post-amp stage providing similar functionality to prevent backscattering of light back into the fiber spool 42. There is a coupler 52 that adds an output of the post-amp stage 26 to an output of the OSC 36 to re-add the OSC channel on the amplifier configuration 20 output. There can be another tap 30 with a second OPM 32 for signal monitoring, and finally an output connector 28.

Additionally, the amplifier configuration 20 includes parameter setting circuitry 54, an input/output mechanism (I/O) 58, and memory 60. The parameter setting circuitry 54 includes integrated circuitry that enables setting of various parameters associated with each component in the amplifier configuration 20. The I/O 58 can be any known communication technique to communicate data to/from the amplifier configuration 20. For example, the I/O 56 can include an RS232 serial data link, an Inter-Integrated Circuit (I2C), any proprietary interface, or the like. The memory 60 can include random-access memory (RAM), read-only memory (ROM), a programmable read-only-memory (PROM), an electronically programmable read-only-memory (EPROM), an electronically erasable and programmable read-only-memory (EEPROM), FLASH memory, registers, combinatory logic, or other similar devices. Generally, a host system or the like can utilize the parameter setting circuitry 54, the I/O 58, and the memory 60, based on a system configuration, to set a desired control power level command for the associated components in the amplifier configuration.

As described herein, there are two conventional methods to achieve proper amplifier configuration 20 control—a "smart" EDFA module and/or subassembly with a built-in control circuit and a "dumb" EDFA module and/or subassembly without a control circuit. The smart EDFA module and/or subassembly with the built-in control circuit has all calibration data stored within the module and/or subassembly. Specifically, the memory 60 would include all manufacturing calibration data and the amplifier configuration 20 would also include a control circuit to perform various functions such as accessing the memory 60 to retrieve the corresponding data to finish power level control, i.e. to properly set all components related to the amplifier configuration 20.

In the present invention, the amplifier configuration 20 is a "dumb" EDFA module and/or subassembly without a control circuit. The parameter setting circuitry 54 as described herein is solely configured to physically set parameters based on input from the host system through the I/O 58. As described herein, the dumb EDFA module and/or subassembly without the control circuit requires the host module for accessing data. In this method, the host module (system) stores all calibration data and a circuit on a host board that accesses the memory 60 to retrieve the corresponding data to finish power level control.

The present invention adds the memory 60 within the dumb amplifier configuration 20. The memory 60 is configured store all relevant data to related to the dumb amplifier configuration 20 such as photodiode (PD) response, pump operation current, VOA setting point at different power levels and configuration. The memory 60 can also contain some other information such as pump kink free current, pump threshold, thermoelectric cooler (TEC) maximum current, and the like for diagnosis purposes related to the dumb amplifier configuration 20. This stored data in the memory 60 can be further used in host module calibration to reduce calibration steps and save calibration time.

Figure 4:
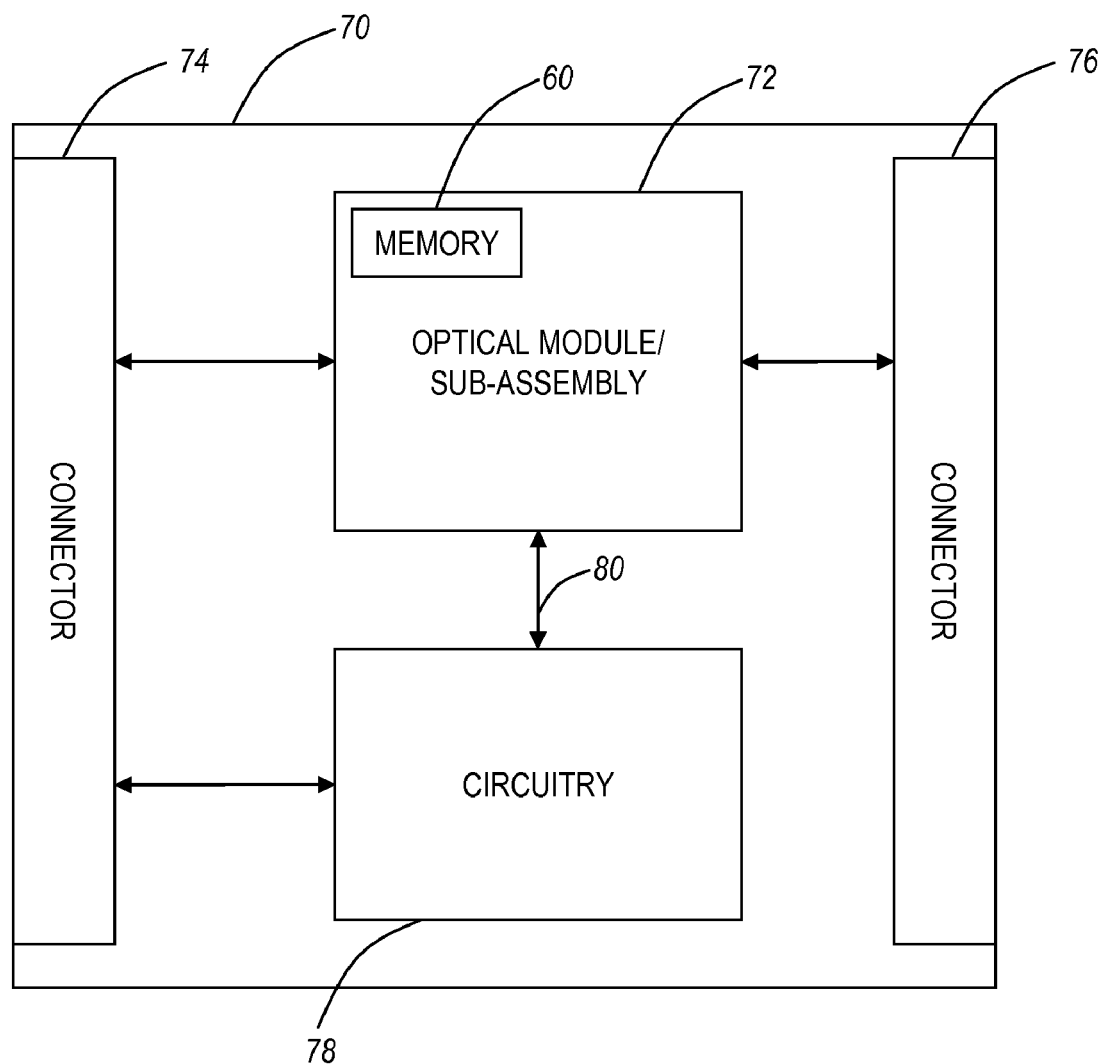
FIG. 4 is a diagram of a host module with an optical module/sub-assembly according to an exemplary embodiment of the present invention.

Referring to FIG. 4, a host module 70 is illustrated with an optical module/sub-assembly 72 according to an exemplary embodiment of the present invention. The host module 70 is an optical and/or electrical module, such as, an optical amplifier (EDFA), optical transceiver, optical power monitor (OPM), de-multiplexer/multiplexer, VOA array, reconfigurable optical add/drop module (ROADM), or any other opto-electrical module. In an exemplary embodiment, the host module 70 includes a connector 74 that can connect the host module 70 to a backplane, mid-plane, etc., and a connector 76 that can include a plurality of optical or electrical connections. Additionally, the host module 70 can include circuitry 78, such as application specific integrated circuits (ASICs) and the like, configured to perform various functions associated with the host module 70. These functions can include, for example, operations, administration, maintenance, and provisioning (OAM&P) related to the host module 70. The circuitry 78 includes an I/O interface 80 to the host module 70. The I/O interface 80 can include an I2C connection or the like. Also, the circuitry 78 connects to the connector 74, as can the optical module/sub-assembly 72. Further, the optical module/sub-assembly 72 can include an optical connection to the connector 76. The host module 70 can include other components which are omitted for illustration purposes.

The present invention provides systems and methods for optical systems integrators, systems designers, and manufacturers to integrate the optical module/sub-assembly 72 into the host module 70. As described herein, the optical module/sub-assembly 72 is a dumb module thereby not including control circuitry and relying on the host module 70 for data access and control. Integrators, designers, and manufacturers utilize optical modules/sub-assemblies 72 from a plurality of suppliers. The present invention enables integrators, designers, and manufacturers the ability to acquire the optical modules/sub-assemblies 72 without embedded control circuitry. This streamlines integration and calibration enabling the integrators, designers, and manufacturers to include this control circuitry and associated functionality on their host module 70.

Specifically, the optical module/sub-assembly 72 includes the memory 60 which is loaded with data relevant to the components within the optical module/sub-assembly 72. This memory 60 includes all relevant data to related to configurations, calibration, manufacturing testing, supportable ranges and settings, etc. for optical components within the optical module/sub-assembly 72. The memory 60 is loaded in a predetermined format available to the integrators, designers, and manufacturers to enable the host module 70 to access and read the memory 60 to ascertain the relevant data. Therefore, the integrators, designers, and manufacturers can design the host module 70 to support any optical module/sub-assembly 72 from a plurality of different suppliers. All of the software design on the host module 70 is reusable with any optical module/sub-assembly 72 assuming the memory 60 is loaded in the proper format. For example, the integrators, designers, and manufacturers can define the predetermined format for the memory 60, and suppliers can adjust the memory 60 as required for different integrators, designers, and manufacturers.

In an exemplary embodiment of the present invention, the optical module/sub-assembly 72 is a gain block, such as used in an EDFA. For example, the gain block can provide optical amplification in the C band (approximately 1528 nm to 1563 nm) or in the L band (approximately 1568 to 1603 nm). In this exemplary embodiment, the memory 60 can be loaded with various parameters from the supplier, such as output power, pump wavelength, operating wavelengths, temperature dependent gain, input voltage, saturated output power, small signal gain, polarization dependent gain, return loss, noise figure per wavelength, gain flatness, input power, operating current and voltage, power dissipation, TEC current and voltage, polarization mode dispersion, and the like. Also, the memory 60 can include information related to setting various configurable settings in the gain block such as pump power, VOA, etc. As described above, in addition to a gain block, the optical module/sub-assembly 72 can be any opto-electrical module known in the art, e.g. optical transceiver, optical power monitor (OPM), de-multiplexer/multiplexer, VOA array, reconfigurable optical add/drop module (ROADM), and the like.

Figure 5:
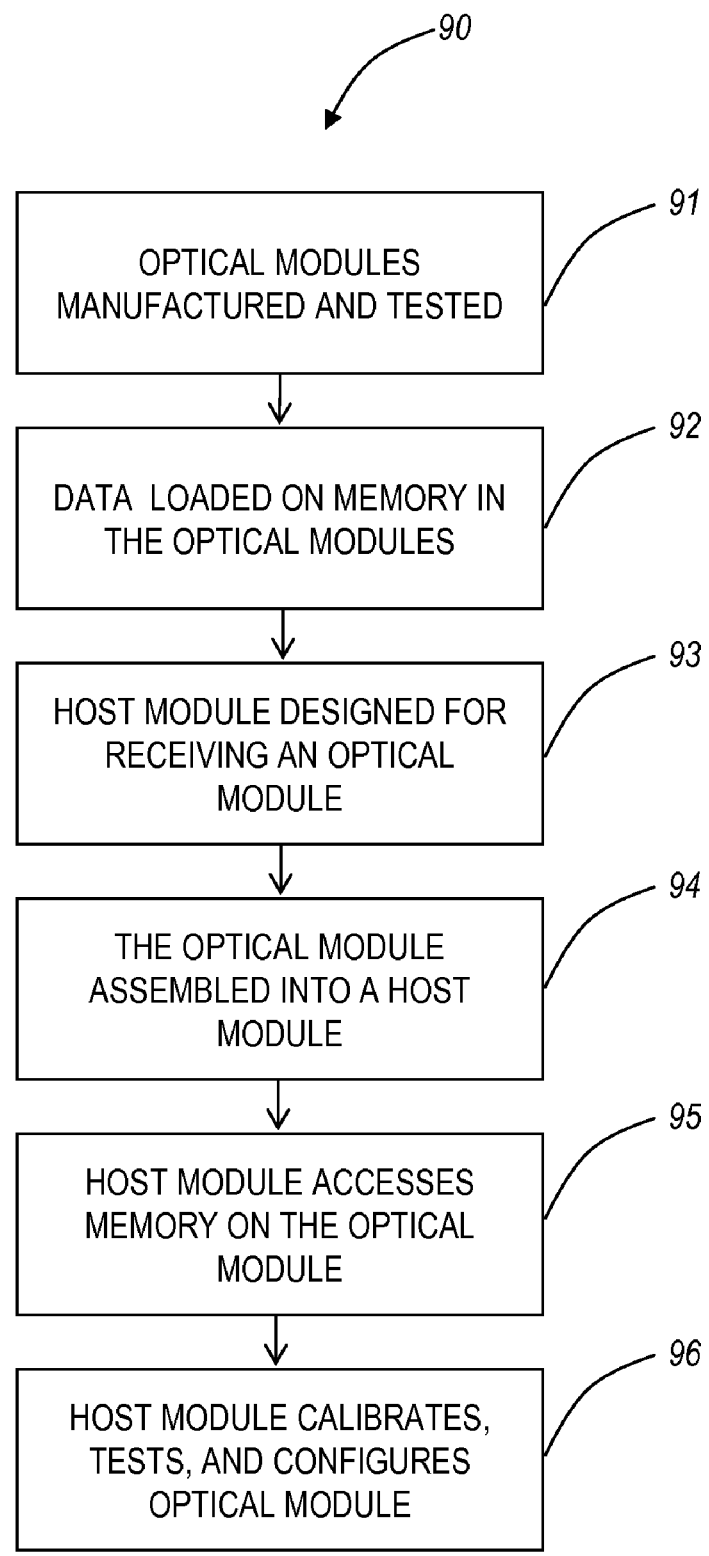
FIG. 5 is a flowchart of a process for integrating an optical module/sub-assembly with a host module according to an exemplary embodiment of the present invention.

Referring to FIG. 5, a flowchart is illustrated of a process 90 for integrating an optical module/sub-assembly with a host module according to an exemplary embodiment of the present invention. The process 90 enables an optical module or sub-assembly to be integrated within a host module with reduced testing, calibration, and configuration. Further, the process 90 reduces overall system complexity by keeping all control circuitry or equivalent on the host module such that the host module controls the optical module or sub-assembly. The optical modules or sub-assemblies are manufactured and tested by a supplier (step 91). Note, there can be a plurality of different suppliers for the optical modules or sub-assemblies. As part of the manufacturing and testing, there are a variety of parameters, testing data, calibration data, settings, and the like (collectively referred to as "module data") associated with the optical modules or sub-assemblies. In the present invention, even though the optical modules or sub-assemblies do not include control circuitry or equivalent, the optical modules or sub-assemblies include a memory (e.g., EEPROM, etc.) that allows the supplier to load the module data in the memory on the optical modules or sub-assemblies (step 92). Steps 91 and 92 are generally performed by suppliers/manufacturers of the optical modules or sub-assemblies. The remaining steps are generally performed by integrators, designers, and manufacturers of optical systems and the like.

The integrators, designers, and manufacturers can, in parallel or prior to steps 91 and 92, design a host module for receiving the optical module/sub-assembly (step 93). For example, a systems designer can design an optical amplifier host module with the optical module/sub-assembly being a gain block. This design step includes building hardware (circuitry on the host device) and software to receiving the optical module/sub-assembly, to interface the optical module/sub-assembly, to access the memory, to provide control functionality, and the like. Further, the design includes software that is configured to properly address the memory and obtain the module data as well as software to control the overall optical module/sub-assembly. Once designed and manufactured, an optical module/sub-assembly is assembled into a host module (step 94). At this stage, the host module includes the optical module/sub-assembly and is presumably a functional unit, such as an optical amplifier. The functional unit requires testing and calibration prior to field deployment. These steps are typically provided in a manufacturing test facility or the like. The host module can access the memory on the optical module/sub-assembly to obtain the module data (step 95). Here, the host module includes software to interface the optical module/sub-assembly based on the design of the host module. Finally, the host module as a functional unit calibrates, tests, and configures the optical module/sub-assembly.

With respect to an optical amplifier, with more sophisticated calibration procedures (such as calibrateable host board circuit current and voltage) and a proper control algorithm, any dumb gain block could be easily plug into any host module and work with minimum verification. This approach is almost equivalent oscilloscopes where any probe can be plugged into any oscilloscope. A dumb gain block with supplier calibrated data can be plugged into any designed circuit pack and fully functioned thereby making the dumb module smarter while avoiding the disadvantages and complexities of smart modules.

As discussed herein, optical modules/sub-assemblies without control circuitry ("dumb modules") are better suited to integrators, designers, and manufacturers of optical systems since the overall system requirements are better understood at this level. Also, these optical modules/sub-assemblies minimize hardware and software defects as those defects would be attributable to the integrators, designers, and manufacturers, not the dumb module, so any problem can be easily and quickly found. The addition of the memory in the optical modules/sub-assemblies significantly reduce labor and time since advanced optical modules/sub-assemblies can include multi-pumps, multi-photo-detectors, and multi-variable-optical-attenuators. This memory enables the integrators, designers, and manufacturers to leverage testing and calibration data already processed by the supplier of the optical modules/sub-assemblies.

In an exemplary embodiment of the present invention, the memory included in the optical modules/sub-assemblies is an EEPROM with an I2C interface. This device, for example, is a very simple ROM which can be at size of 2×3 mm$^2$ with a built-in I2C interface. Also, the additional cost associated with such as device is almost nothing while saving on the order of hours in system testing, calibration, etc.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention and are intended to be covered by the following claims.

What is claimed is:

1. A module, comprising:
   one or more optical components comprising a plurality of configurable parameters;
   memory comprising data loaded by a module supplier relevant to the one or more optical components;
   wherein the module is configured to operate within a host module, and wherein the module comprises no control circuit thereby utilizing control circuitry on the host module; and
   an interface communicatively coupled to the memory for accessing the data relevant to the one or more optical components and providing the data to the host module.

2. The module of claim 1, wherein the one or more optical components comprise an optical amplifier gain block.

3. The module of claim 1, wherein the one or more optical components comprise any of erbium doped fiber, optical isolators, monitor taps, photo detectors, pump lasers, variable optical attenuators, couplers, and splitters.

4. The module of claim 1, further comprising a communication interface to the host module.

5. The module of claim 4, wherein the memory is loaded by the module supplier with data for the one or more optical components, and wherein the data comprises any of configuration settings, calibration data, manufacturing testing data, and supportable ranges.

6. The module of claim 5, wherein the data comprises photodiode response, pump operation current, and variable optical attenuator setting points at different power levels and configurations.

7. The module of claim 5, wherein the data comprises pump kink free current, pump threshold, and thermoelectric cooler maximum current.

8. The module of claim 1, wherein the memory comprises any of random-access memory (RAM), read-only memory (ROM), a programmable read-only-memory (PROM), an electronically programmable read-only-memory (EPROM), an electronically erasable and programmable read-only-memory (EEPROM), FLASH memory, registers, and combinatory logic.

9. The module of claim 1, wherein the memory comprises an electronically erasable and programmable read-only-memory (EEPROM) with an integrated Inter-Integrated Circuit (I2C) for communication.

10. The module of claim 1, wherein the module comprises one of an optical transceiver, an optical power monitor (OPM), a de-multiplexer/multiplexer, a variable optical attenuator (VOA) array, and a reconfigurable optical add/drop module (ROADM).

11. A method of integrating an optical sub-assembly with a host module, comprising:
    obtaining an optical sub-assembly from a sub-assembly supplier, wherein the optical sub-assembly comprises memory and does not comprise a control circuit;
    assembling the optical sub-assembly with a host module adapted to receive the optical sub-assembly;
    accessing the memory on the optical sub-assembly with the host module to access data related to optical components in the optical sub-assembly; and
    calibrating, testing, and configuring the optical sub-assembly with the host module utilizing the data.

12. The method of claim 11, wherein the optical sub-assembly comprises an optical amplifier gain block.

13. The method of claim 11, wherein the optical sub-assembly comprises components comprising any of erbium doped fiber, optical isolators, monitor taps, photo detectors, pump lasers, variable optical attenuators, couplers, and splitters.

14. The method of claim 11, wherein the memory is loaded by the sub-assembly supplier with data for one or more optical components, and wherein the data comprises any of configuration settings, calibration data, manufacturing testing data, and supportable ranges.

15. The method of claim 14, wherein the data comprises photodiode response, pump operation current, and variable optical attenuator setting points at different power levels and configurations, and wherein the data further comprises pump kink free current, pump threshold, and thermoelectric cooler maximum current.

16. The method of claim 11, wherein the memory comprises any of random-access memory (RAM), read-only memory (ROM), a programmable read-only-memory (PROM), an electronically programmable read-only-memory (EPROM), an electronically erasable and programmable read-only-memory (EEPROM), FLASH memory, registers, and combinatory logic.

17. The method of claim 11, wherein the memory comprises an electronically erasable and programmable read-only-memory (EEPROM) with an integrated Inter-Integrated Circuit (I2C) for communication.

18. An optical amplifier, comprising:
    a plurality of optical components each comprising a plurality of configurable parameters, wherein the plurality of optical components comprise a length of erbium doped fiber, one or more optical isolators, one or more monitor taps, one or more photo detectors, one or more pump lasers, one or more variable optical attenuators, one or more couplers, and one or more splitters;
    memory comprising data loaded by a module supplier relevant to the plurality of optical components;
    wherein the optical amplifier is configured to operate within a host module, and wherein the optical amplifier comprises no control circuit thereby utilizing control circuitry on the host module; and
    an interface communicatively coupled to the memory for accessing the data relevant to the plurality of optical components and providing the data to the host module.

19. The optical amplifier of claim 18, wherein the memory is loaded by the module supplier with data for the one or more optical components, and wherein the data comprises any of configuration settings, calibration data, manufacturing testing data, and supportable ranges.

20. The optical amplifier of claim 18, wherein the data comprises any of photodiode response, pump operation current, variable optical attenuator setting points at different power levels and configurations, pump kink free current, pump threshold, and thermoelectric cooler maximum current.

* * * * *